(12) United States Patent
Suzuki et al.

(10) Patent No.: US 9,326,050 B2
(45) Date of Patent: Apr. 26, 2016

(54) WAVELENGTH SELECTIVE SWITCH AND METHOD OF MANUFACTURING SAME

(71) Applicant: Sumitomo Electric Industries, Ltd., Osaka-shi (JP)

(72) Inventors: Masaki Suzuki, Yokohama (JP); Takafumi Ohtsuka, Yokohama (JP); Takeshi Inoue, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/333,231

(22) Filed: Jul. 16, 2014

(65) Prior Publication Data
US 2015/0023662 A1    Jan. 22, 2015

(30) Foreign Application Priority Data

Jul. 17, 2013 (JP) ............. PCT/JP2013/069405
Aug. 1, 2013 (JP) ...................... 2013-160428

(51) Int. Cl.
*H04Q 11/00* (2006.01)
*H04J 14/02* (2006.01)
*G02B 6/26* (2006.01)

(52) U.S. Cl.
CPC ........... *H04Q 11/0005* (2013.01); *H04J 14/02* (2013.01); *H04Q 2011/0026* (2013.01); *H04Q 2011/0035* (2013.01); *H04Q 2011/0041* (2013.01); *H04Q 2201/804* (2013.01)

(58) Field of Classification Search
CPC ............ H04J 14/02; H04J 14/0213; H04Q 2011/0041; H04Q 2011/0035; G02B 6/3512; G02B 6/356

USPC ................................. 398/48, 45, 43
See application file for complete search history.

(56) References Cited

U.S. PATENT DOCUMENTS 7,397,980 B2    7/2008  Frisken
7,725,027 B2    5/2010  Keyworth et al.
(Continued)

FOREIGN PATENT DOCUMENTS

JP    2008-224824 A    9/2008
JP    2009-276747 A    11/2009
(Continued)

OTHER PUBLICATIONS

International Search Report in PCT International Application No. PCT/JP2013/069405, dated Sep. 17, 2013.
(Continued)

*Primary Examiner* — Oommen Jacob
(74) *Attorney, Agent, or Firm* — Venable LLP; Michael A. Sartori; Tamatane J. Aga

(57) ABSTRACT

An light input/output unit has at least three first ports, including a first input port for inputting light and a first output port for outputting light; at least three second ports, including a second input port for inputting light and a second output port for outputting light; and an alignment port for inputting and outputting alignment light. An optical axis of the input/output light of the first port and an optical axis of the input/output light of the second port differ from each other. The dispersive element changes the optical axes of input/output lights of the first and second ports by an angle corresponding to a wavelength. The light deflective element has a first part for directing the light from the first input port to the first output port and a second part for directing the light from the second input port to the second output port.

9 Claims, 15 Drawing Sheets

(56) References Cited

U.S. PATENT DOCUMENTS

| | | | | |
|---|---|---|---|---|
| 2008/0298738 | A1* | 12/2008 | Ishikawa | G02B 6/12 |
| | | | | 011 385/3 |
| 2009/0110349 | A1* | 4/2009 | Presley | G02B 6/293 |
| | | | | 11 385/17 |
| 2011/0229132 | A1* | 9/2011 | Matsumoto | G02B 6/35 |
| | | | | 48 398/48 |
| 2011/0292482 | A1* | 12/2011 | Matsumoto | G02B 6/356 |
| | | | | 359/223.1 |
| 2012/0057869 | A1* | 3/2012 | Colbourne | H04J 14/0213 |
| | | | | 398/49 |
| 2012/0237218 | A1* | 9/2012 | Yang | G02B 6/356 |
| | | | | 398/48 |
| 2012/0328238 | A1* | 12/2012 | Inoue | G02B 6/32 |
| | | | | 385/16 |
| 2013/0028556 | A1* | 1/2013 | Cohen | G02B 6/351 |
| | | | | 385/17 |
| 2014/0072302 | A1* | 3/2014 | Iwama | H04Q 11/0005 |
| | | | | 398/48 |
| 2014/0268305 | A1* | 9/2014 | Tazawa | G02F 1/31 |
| | | | | 359/320 |
| 2015/0023662 | A1* | 1/2015 | Suzuki | H04J 14/02 |
| | | | | 398/48 |

FOREIGN PATENT DOCUMENTS

| | | |
|---|---|---|
| JP | 2010-509639 A | 3/2010 |
| JP | 2011-064721 A | 3/2011 |
| JP | 2011-248000 A | 12/2011 |
| WO | WO-2008/057347 A2 | 5/2008 |
| WO | WO-2012/125390 A2 | 9/2012 |
| WO | WO-2013/016758 A1 | 2/2013 |

OTHER PUBLICATIONS

International Search Report in PCT International Application No. PCT/JP2013/081542, dated Feb. 10, 2014.

International Preliminary Report on Patentability in Patent Application No. PCT/JP2013/081542, dated Jan. 28, 2016.

International Preliminary Report on Patentability in Patent Application No. PCT/JP2013/069405, dated Jan. 28, 2016.

* cited by examiner

WAVELENGTH SELECTIVE SWITCH AND METHOD OF MANUFACTURING SAME

BACKGROUND OF THE INVENTION

1. Field of the Invention

One aspect of the present invention relates to a wavelength selective switch and a method of manufacturing the same.

2. Related Background Art

U.S. Patent Application Publication No. 2012/0237218 discloses a wavelength selective switch (WSS). This wavelength selective switch comprises a collimator array, a relay optical system, a wavelength dispersive element, a condensing optical system, and two mirrors. Two waveguides are provided for each of collimator lenses included in the collimator array. Each of the two waveguides constitute two light input/output ports. Light input/output angles of these light input/output ports are different from each other.

SUMMARY OF THE INVENTION

The wavelength selective switch includes an light input/output unit, a dispersive element, and a light deflective element which are juxtaposed on a predetermined axis. Some wavelength selective switch includes the light input/output unit divided into two or more groups, and, for example, each group are juxtaposed in a direction intersecting the dispersing direction. Such a wavelength selective switch can separate (or combine) a greater number of wavelength components than conventional wavelength selective switches.

In such a wavelength selective switch, an optical axis of each light of input/output port may be tilted with respect to the above-mentioned predetermined axis in order for light from the light input/output port of each group to reach its corresponding light deflective part (see, for example, U.S. Patent Application Publication No. 2012/0237218). But aligning the light input/output ports may be hard when the optical axis of each light of the input/output port is tilted. Typical wavelength selective switches include input/output ports providing optical axis propagating along the above-mentioned predetermined axis. So input/output port can be easily aligned by inputting alignment light via a certain light input/output port, and adjusting the optical axis of return light and the optical axis of the light input/output ports come closer to each other such that light returning to this light input/output port has a higher intensity. When the input/output optical axes tilt, however, positional deviations of the light input/output unit in the above-mentioned predetermined axis direction cause the light intensity of the return light to fluctuate, thereby making it hard to align the light input/output unit accurately.

The wavelength selective switch in accordance with one aspect of the present invention comprises an light input/output unit, a dispersive element, and a light deflective element which are optically coupled along a predetermined axis. The light input/output unit has at least three first light input/output ports, including a first light input port for inputting light and a first light output port for outputting light, an optical axis of input/output light being tilted to a first direction with respect to the predetermined axis, the first direction intersecting the predetermined axis; at least three second light input/output ports, including a second light input port for inputting light and a second output port for outputting light, an optical axis of input/output light being tilted to the first direction with respect to the predetermined axis; and an alignment port for inputting and outputting alignment light with an optical axis along the predetermined axis. The optical axis of the input/output light of the first light input/output port and the optical axis of the input/output light of the second light input/output port are different from each other. The dispersive element changes the optical axis of the input/output light of the first light input/output port and the optical axis of the input/output light of the second light input/output port to a direction intersecting the predetermined axis and first direction by an angle corresponding to a wavelength. The light deflective element has a first light deflective part for directing the light input from the first light input port via the dispersive element to the first light output port and a second light deflective part for directing the light input from the second light input port via the dispersive element to the second light output port.

DETAILED DESCRIPTION OF THE EMBODIMENTS

Description of Embodiments

Figure 1:
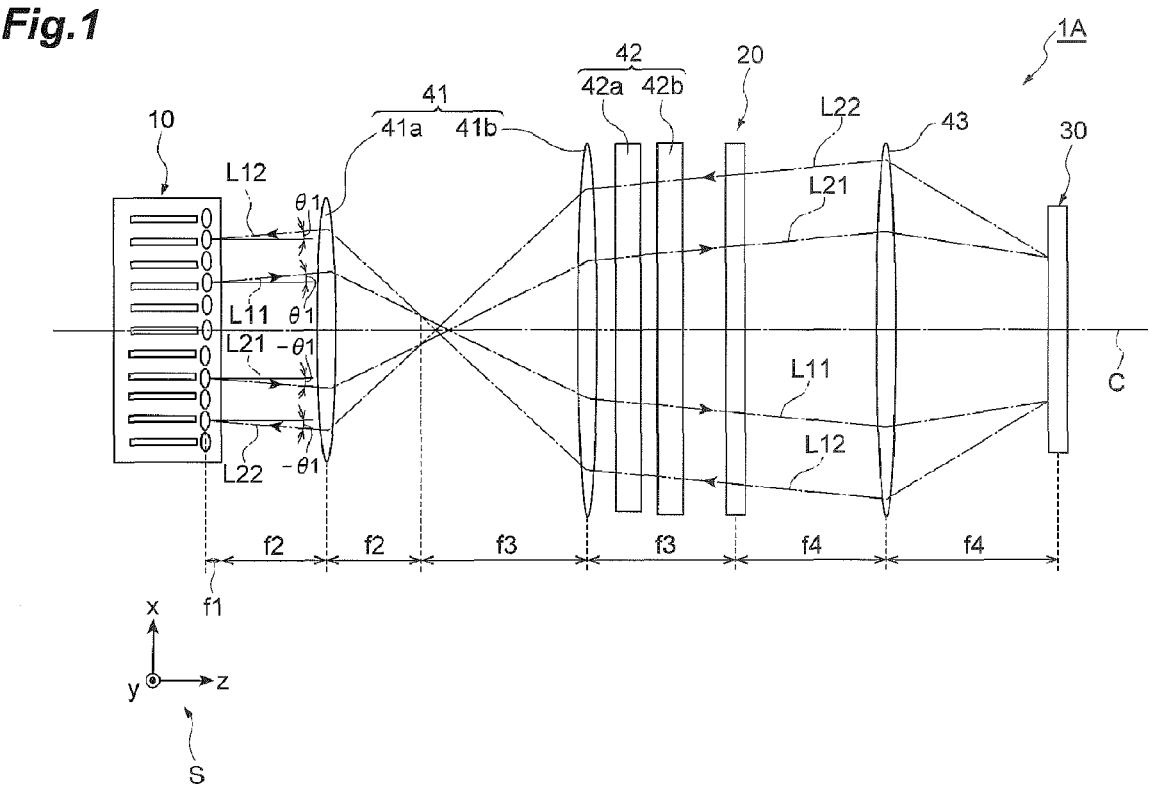
FIG. 1 is a schematic view illustrating a structure of the wavelength selective switch in accordance with a first embodiment.

First, embodiments of the wavelength selective switch and method of manufacturing the same in accordance with one aspect of the present invention will be listed for explanation.

The wavelength selective switch in accordance with one embodiment is a wavelength selective switch comprising an light input/output unit, a dispersive element, and a light deflective element which are optically coupled along a predetermined axis; the light input/output port having at least three first light input/output ports, including a first light input port for inputting light and a first light output port for outputting light, an optical axis of input/output light being tilted to a first direction with respect to the predetermined axis, the first direction intersecting the predetermined axis, at least three second light input/output ports, including a second light input port for inputting light and a second output port for outputting light, an optical axis of input/output light being tilted to the first direction with respect to the predetermined axis, and an alignment port for inputting and outputting alignment light with an optical axis along the predetermined axis; the optical axis of the input/output light of the first light input/output port and the optical axis of the input/output light of the second light input/output port are different from each other; the dispersive element changing the optical axis of the input/output light of the first light input/output port and the optical axis of the input/output light of the second light input/output port to a direction intersecting the predetermined axis and first direction by an angle corresponding to a wavelength; the light deflective element having a first light deflective part for directing the light input from the first light input port via the dispersive element to the first light output port and a second light deflective part for directing the light input from the second light input port via the dispersive element to the second light output port.

In the wavelength selective switch in accordance with one embodiment, each of the first light input/output port, the second light input/output port, and the alignment port may include an optical fiber, an optical axis direction of the optical fibers of the first light input/output port may be different from the optical axis of the input/output light of the first light input/output port, and an optical axis direction of the optical fiber of the second light input/output ports may be different from the optical axis of the input/output light of the second light input/output ports, an optical axis direction of the optical fiber of the alignment port may coincide with the optical axis of the alignment light.

In the wavelength selective switch in accordance with one embodiment, the optical fibers of the first light input/output port, the optical fiber of the second light input/output port, and the optical fiber of the alignment port may have optical axis along the predetermined axis, each of the first light input/output ports, the second light input/output ports, and alignment port may further include a condensing element optically coupled to an end face of the optical fiber, an optical axis of the optical fiber of the first light input/output port and an optical axis of the optical fiber of the second light input/output port, and an optical axis of the condensing element may be shifted from each other, and an optical axis of the optical fiber of the alignment port may coincide with the optical axis of the condensing element.

In the wavelength selective switch in accordance with one embodiment, an amount of shift between the optical axis of the optical fiber of the first light input/output port and the optical axis of the condensing element may be identical, an amount of shift between the optical axis of the optical fiber of the second light input/output port and the optical axis of the condensing element may be identical, and the amount of shift in the first light input/output port and the amount of shift in the second light input/output port may be different from each other.

In the wavelength selective switch in accordance with one embodiment, the first light input/output port and the second light input/output port may be juxtaposed in the first direction, and the alignment port may be disposed at either both ends of the row of the first input/output port and the second light input/output port or a location between the first light input/output port and the second light input/output port, or both.

In the wavelength selective switch in accordance with one embodiment, the first light input/output port, the second light input/output port, and the alignment port may include an optical waveguide and a condensing element optically coupled to an end face of at least two of the optical waveguide, an optical axis of the optical waveguide constituting the first light input/output port and the second light input/output port may shift form an optical axis of the condensing element, and an optical axis of the optical waveguide constituting the alignment port may coincide with an optical axis of the condensing element.

The method of manufacturing a wavelength selective switch in accordance with one embodiment is a method of manufacturing any of the above-mentioned wavelength selective switches, the method comprising a first step of inputting alignment light via the alignment port; a second step of receiving the alignment light reflected by a mirror arranged on the predetermined axis or the light deflective element through the alignment port so as to detect an intensity of the alignment light; and a third step of adjusting an angle of the optical axis of the light input/output unit with reference to the predetermined axis in such a direction that the intensity of the alignment light obtained in the second step increases.

In the method of manufacturing a wavelength selective switch in accordance with one embodiment, the wavelength selective switch may further comprise a front optical system arranged between the light input/output unit and dispersive element on the predetermined axis, and the mirror may be arranged between the light input/output unit and the front optical system, so as to receive the alignment light reflected by the mirror through the alignment port.

In the method of manufacturing a wavelength selective switch in accordance with one embodiment, the light input/output unit may have a plurality of alignment ports, and the angle may be adjusted in such direction that equalize intensities of the alignment lights received through the plurality of alignment ports in the third step.

Detail of Embodiment

In the following, embodiments of the wavelength selective switch and method of manufacturing the same in accordance with the present invention will be explained in detail with reference to the accompanying drawings. Further, the same elements in the description of the drawings are denoted with the same reference signs, and a repeated description is omitted. Further, one aspect of the present invention is not limited to the following embodiments. One aspect of the present invention is defined by the claims, and all changes within the meaning and scope equivalent to the claims are intended to be included.

First Embodiment

Figure 2:
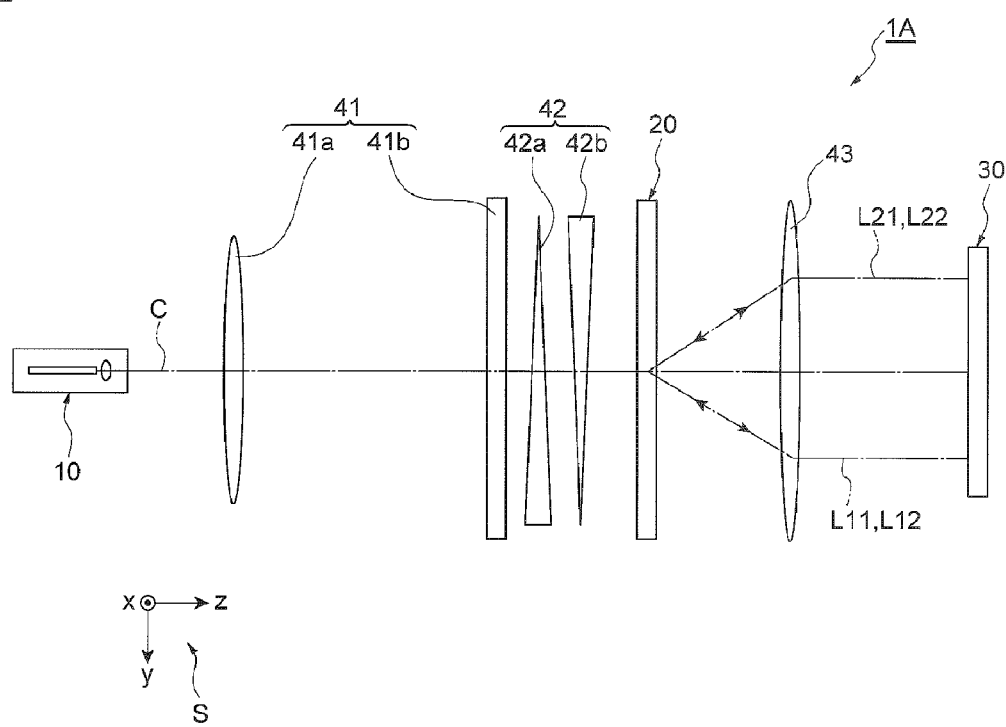
FIG. 2 is a schematic view illustrating a structure of the wavelength selective switch in accordance with the first embodiment.

FIGS. 1 and 2 are schematic views illustrating structures of a wavelength selective switch 1A in accordance with the first embodiment. The following drawings display an orthogonal coordinate system S. FIG. 1 is a side view of the wavelength selective switch 1A as seen from a direction of the y-axis of the orthogonal coordinate system S. FIG. 1 illustrates a schematic structure of the wavelength selective switch 1A in a plane including the x-axis and z-axis. FIG. 2 is a top plan view of the wavelength selective switch 1A as seen from a direction of the x-axis of the orthogonal coordinate system S. FIG. 2 illustrates a schematic structure of the wavelength selective switch 1A in a plane including the y-axis and z-axis.

As illustrated in FIGS. 1 and 2, the wavelength selective switch 1A comprises an light input/output unit 10, a dispersive element 20, and a light deflective element 30. The light input/output unit 10, dispersive element 20, and light deflective element 30 are optically coupled along a predetermined axis C. The predetermined axis C extends along the z-axis direction, for example. The predetermined axis C, which is depicted as a single line in FIGS. 1 and 2, may be bent with a mirror or the like arranged in the middle, for example.

Figure 3:
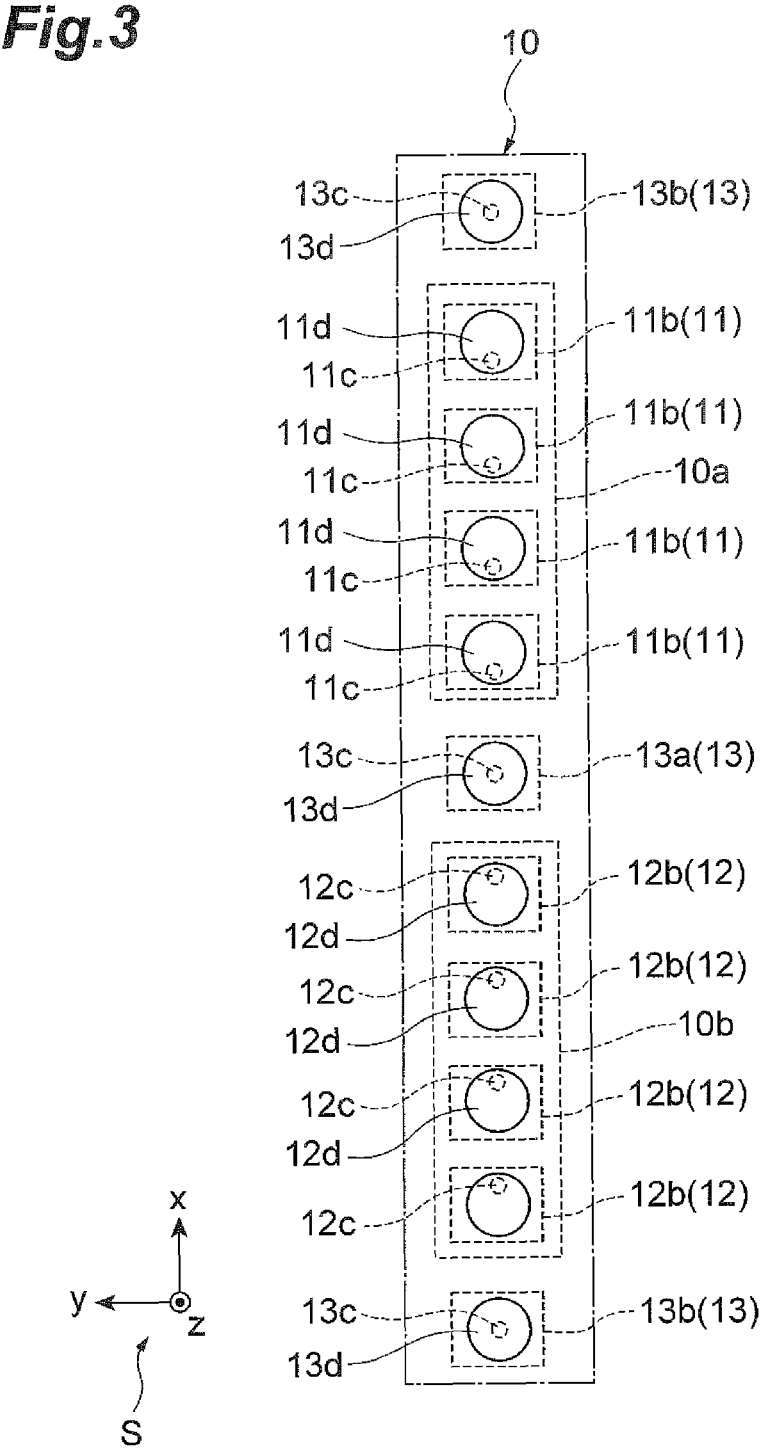
FIG. 3 is a diagram illustrating a structure of an light input/output unit as seen from the z-axis direction.
Figure 4:
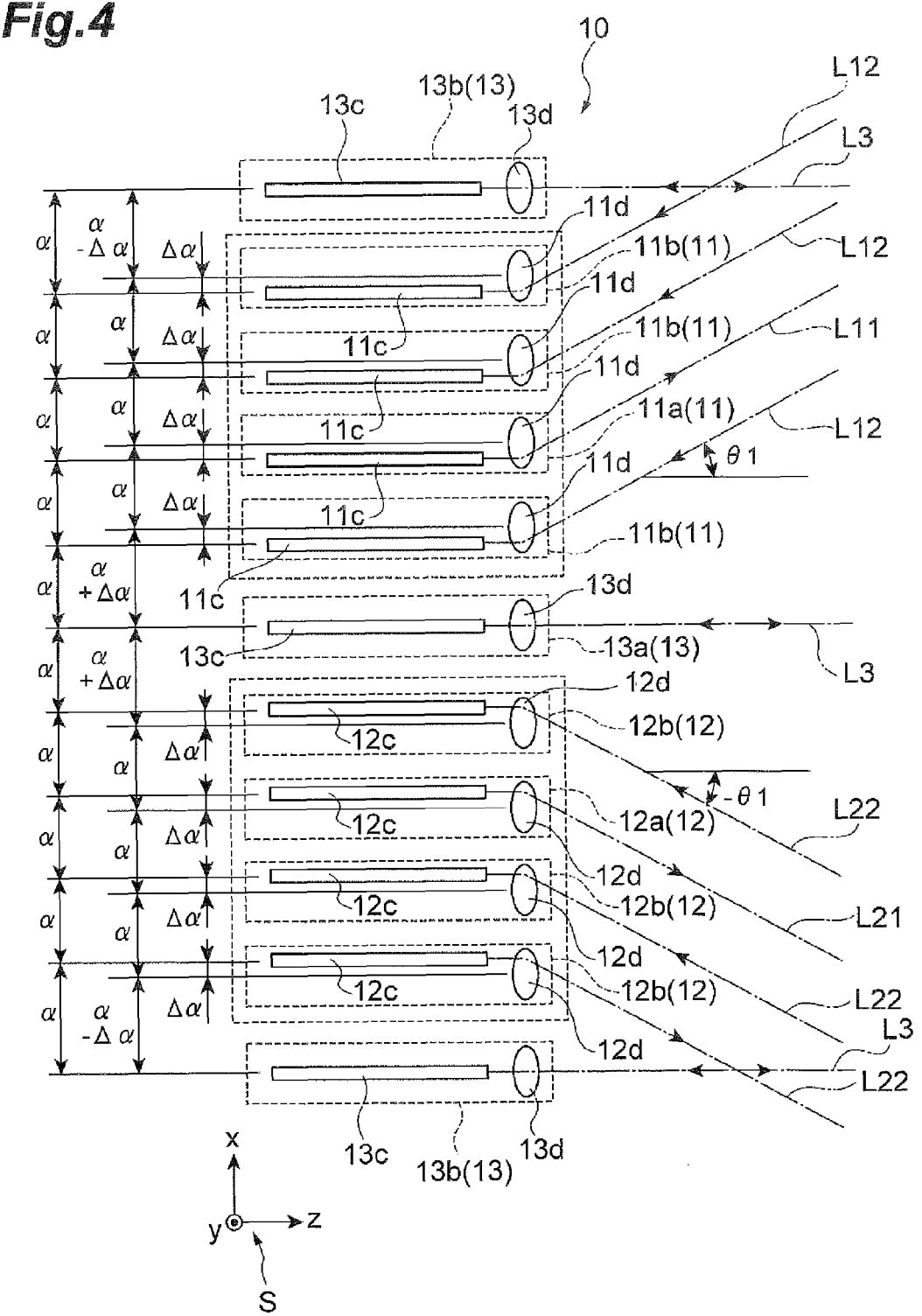
FIG. 4 is a side view illustrating a structure of the light input/output unit as seen from the y-axis direction.

FIG. 3 is a diagram illustrating a structure of the light input/output unit 10 as seen from a direction of the predetermined axis C (z-axis direction). FIG. 4 is a side view illustrating a structure of the light input/output unit 10 as seen from the y-axis direction. As illustrated in FIGS. 3 and 4, the light input/output unit 10 has a first part 10a and a second part 10b. The first part 10a and the second part 10b are juxtaposed in a first direction (x-axis direction) intersecting the predetermined axis C illustrated in FIGS. 1 and 2.

The first part 10a includes at least three first light input/output ports 11. These light input/output ports 11 are arranged in a row along the x-axis direction. The light input/output ports 11 include one or a plurality of light input ports 11a and one or a plurality of light output ports 11b. FIGS. 3 and 4 exemplify one light input port 11a and a plurality of light output ports 11b. The light input port 11a emits light L11, an example of which is wavelength-multiplexed light, into the wavelength selective switch 1A. The output ports 11b receive wavelength components L12 deflected by the light deflective element 30.

In the first part 10a, as illustrated in FIG. 4, the light input/output ports 11 performs inputting and outputting light (i.e., input port 11a inputs the light L11, and output ports 11b outputs the wavelength components L12) with an optical axis tilted to the first direction (x-axis direction) intersecting the predetermined axis C with respect to the predetermined axis C. With reference to the predetermined axis C taken as 0°, the light input/output ports 11 have an input/output angle θ1 falling within the range of 0°<θ1<5°, for example, more specifically 0°<θ1<3°.

The second part 10b includes at least three second light input/output ports 12. These light input/output ports 12 are arranged in a row along the x-axis direction. The light input/output ports 12 include one or a plurality of light input ports 12a and one or a plurality of light output ports 12b. FIGS. 3 and 4 exemplify one light input port 12a and a plurality of light output ports 12b. The light input port 12a emits light L21, an example of which is wavelength-multiplexed light, into the wavelength selective switch 1A. The output ports 12b receive wavelength components L22 deflected by the light deflective element 30.

In the second part 10b, as illustrated in FIG. 4, the light input/output ports 12 performs inputting and outputting light (i.e., input port 12a inputs the light L21, and output ports 12b outputs the wavelength components L22) with an optical axis tilted to the x-axis direction. The input/output angle of the light input/output ports 12 with respect to the predetermined axis C differs from the input/output angle θ1 of the light input/output ports 11 and is −θ1, for example.

Each light input/output port 11 includes an optical fiber 11c and a condensing element (condensing lens) 11d. Each condensing element 11d is optically coupled to an end face of its corresponding optical fiber 11c. Similarly, each light input/output port 12 includes an optical fiber 12c and a condensing element (condensing lens) 12d. Each condensing element 12d is optically coupled to an end face of its corresponding optical fiber 12c.

As illustrated in FIG. 4, each optical fiber 11c and its corresponding condensing element 11d have optical axes shifted from each other. Specifically, the optical axis of the condensing element 11d is shifted from that of the optical fiber 11c by Δα (>0). The amounts of shift Δα are identical each other, in the light input/output ports 11. This provides the light input/output ports 11 with a uniform positive input/output angle θ1. In this embodiment, the optical fibers 11c are arranged at equal intervals α, and their corresponding condensing elements 11d are also arranged at equal intervals α.

Each optical fiber 12c and its corresponding condensing element 12d also have optical axes shifted from each other. However, their amount of shift differs from that of the condensing elements 11d and is −Δα. The amounts of shift −Δα are identical each other, in the light input/output ports 12. This provides the light input/output ports 12 with a uniform negative input/output angle −θ1. In this embodiment, the optical fibers 12c are arranged at equal intervals α, and their corresponding condensing elements 12d are also arranged at equal intervals α.

The light input/output unit 10 further has three alignment ports 13. The alignment ports 13 input/output alignment light L3 with an optical axis lying along the predetermined axis C. Each of the alignment ports 13 includes an optical fiber 13c and a condensing element 13d optically coupled to an end face of the optical fiber 13c. The optical fiber 13c and condensing element 13d have optical axes coinciding with each other. Therefore, the alignment port 13 propagates the light L3 along the predetermined axis C.

The three alignment ports 13 include one alignment port 13a and two alignment ports 13b. The alignment port 13a is arranged between the light input/output ports 11 and the light input/output ports 12 (typically in the center of the light input/output unit 10 in the x-direction). The two alignment ports 13b are arranged on both sides in the x-axis direction of the alignment port 13a. Specifically, the two alignment ports 13b are arranged at both ends in the row of the light input/output ports 11, 12 (i.e., at both ends in the x-axis direction of the light input/output unit 10).

The optical fibers 11c, 12c, 13c are arranged at intervals α. The condensing elements 11d, 12d, 13d are arranged at intervals α+Δα (or α−Δα). In other words, the optical fibers 11c, 12c, 13c are arranged at equal pitches, while the condensing elements 11d, 12d, 13d are arranged at unequal pitches. The positions of the condensing elements 11d are shifted from their corresponding optical fibers 11c to positive side of the x-axis. The positions of the condensing elements 12d are shifted from their corresponding optical fibers 12c to negative side of the x-axis. Such a structure achieves the amount of shift Δα between the optical axis of the optical fiber 11c and the optical axis of the condensing element 11d and the amount of shift −Δα between the optical axis of the optical fiber 12c and the optical axis of the condensing element 12d.

Reference will be made to FIGS. 1 and 2 again. The wavelength selective switch 1A further comprises a relay optical system 41 and an anamorphic optical system 42 as a front optical system arranged on the predetermined axis C between the light input/output unit 10 and the dispersive element 20. The relay optical system 41 includes two lenses 41a, 41b provided in common for the light input/output ports 11, 12. An example of the lens 41a is a convex spherical lens having optical powers in the x-axis direction and y-axis direction. The lens 41a is arranged in front of the lens 41b. The front-side focal point of the lens 41a substantially coincide with the rear-side focal point of the condensing elements 11d to 13d (see FIG. 4). That is, the lens 41a is arranged at a position separated from the condensing elements 11d, 12d by the focal length f1 of the condensing elements 11d to 13d and the focal length f2 of the lens 41a.

In the x-axis direction and y-axis direction, the lens 41a can make the light L11 and light L12 have larger beam sizes at their beam waist positions after passing the lens 41a than beam sizes at their beam waist positions entering the lens 41a from the light input/output unit 10. This can restrain optical loss from increasing at the light input/output ports 11, 12 when controlling light through the relay optical system 41 and anamorphic optical system 42.

The lens 41b has an optical power at least in the x-axis direction. An example of the lens 41b is a cylindrical lens having an optical power only in the x-axis direction. The front-side focal point of the lens 41b is arranged so as to substantially coincide with the rear-side focal point of the lens 41a. The rear-side focal point of the lens 41b is arranged so as to substantially coincide with the front-side focal point of a condensing lens 43 which will be explained later. That is, the lens 41b is arranged at a position separated from the lens 41a by the focal length f2 of the lens 41a and the focal length f3 of the lens 41b and from the condensing lens 43 by the focal length f3 of the lens 41b and the focal length f4 of the condensing lens 43. The lenses 41a, 41b are not limited to those of light transmission type as illustrated in FIGS. 1 and 2 but may be of reflection type such as mirrors.

The anamorphic optical system 42 change the aspect ratio of a beam inputted thereto and then output the beam. The anamorphic optical system 42 is provided in common for the light input/output ports 11, 12. The anamorphic optical system 42 is arranged in front of or behind the relay optical system 41. FIGS. 1 and 2 exemplify the anamorphic optical system 42 is arranged behind the relay optical system 41. The anamorphic optical system 42 receives the light L11, L21 emitted from the lens 41b of the relay optical system 41 and outputs the light L11, L21 with its beam size enlarged in the y-axis direction. The anamorphic optical system 42 can be constituted by any of prism pairs, cylindrical lenses, cylindrical mirrors, and the like either singly or in combinations. This embodiment exemplifies a pair of prisms 42a, 42b.

The dispersive element 20 is provided in common for the light input/output ports 11, 12. The dispersive element 20 changes the optical axes of input/output lights of the light input/output ports 11, 12 by an angle corresponding to the wavelength toward a direction intersecting the predetermined axis C and x axis (e.g., y-axis direction). When the light L11, L21 from the light input ports 11a, 12a is wavelength-multiplexed light, the dispersive element 20 disperses the light L11, L21 into a plurality of wavelength components. For easier understanding, FIGS. 1 and 2 illustrate only some wavelength components L12, L22 in a plurality of wavelength components as representatives. For example, a diffraction grating can be used as the dispersive element 20.

The condensing lens (condensing element) 43 is arranged on the predetermined axis C between the dispersive element 20 and light deflective element 30. The condensing lens 43 receives the wavelength components L12, L22 dispersed by the dispersive element 20. The condensing lens 43 deflects the wavelength components L12, L22 toward the light deflective element 30 while collimating them in the x-axis direction and condenses them onto the light deflective element 30 in the y-axis direction. A rotationally symmetrical lens such as a convex spherical lens having optical powers in the x-axis direction and y-axis direction may be used as the condensing lens 43.

The light deflective element 30 is arranged at the rear-side focal point of the condensing lens 43. The light deflective element 30 receives the wavelength component L12 condensed by the condensing lens 43. The light deflective element 30 deflects the wavelength component L12 toward the predetermined light output port 11b. Similarly, the light deflective element 30 receives the wavelength component L22 condensed by the condensing lens 43. The light deflective element 30 deflects the wavelength component L22 toward the predetermined light output port 12b. For these purposes, the light deflective element 30 has a plurality of light deflective regions arranged two-dimensionally within a plane intersecting the predetermined axis C. The deflective element 30 receives the wavelength components L12, L22 in their corresponding light deflective regions and deflects the wavelength components L12, L22 independently toward the light output ports 11b, 12b, respectively.

Figure 5:
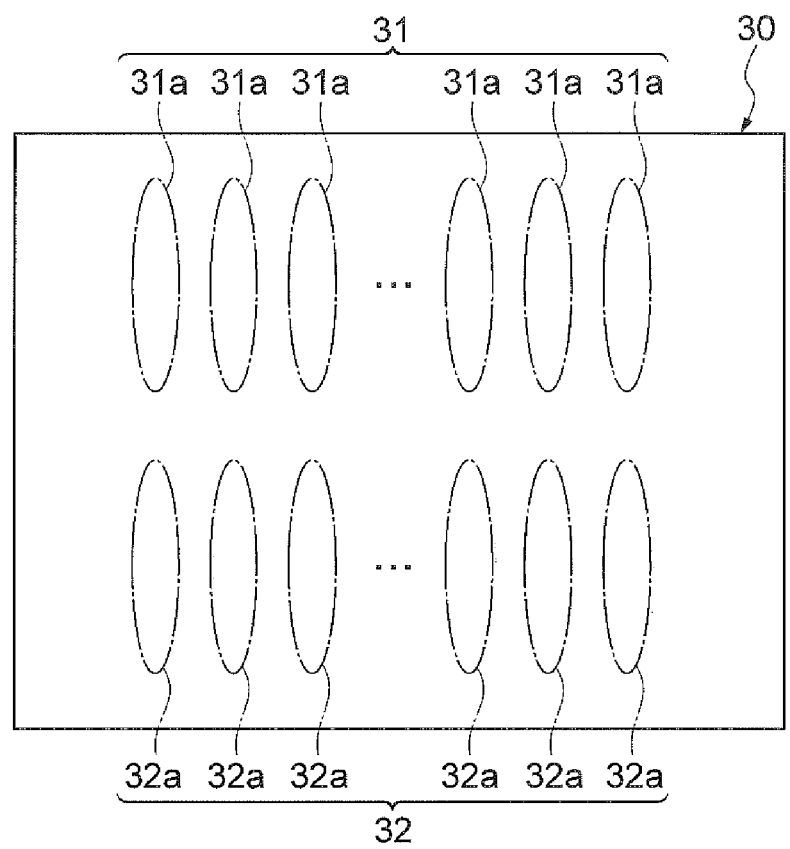
FIG. 5 is a front view of a light deflective element as seen from the z-axis direction.

FIG. 5 is a front view of the light deflective element 30 as seen in the predetermined axis C. As illustrated in FIG. 5, the light deflective element 30 has first light deflective part 31 and second light deflective part 32 juxtaposed along the x-axis direction. The first light deflective part 31 includes a plurality of light deflective regions 31a juxtaposed along the y-axis direction (dispersing direction). The first light deflective part 31 receives wavelength components in their corresponding light deflective regions 31a and directs these wavelength components toward the light output ports 11b. The second light deflective part 32 includes a plurality of light deflective regions 32a juxtaposed along the y-axis direction (dispersing direction). The second light deflective part 32 receives wavelength components in their corresponding light deflective regions 32a and directs these wavelength components toward the light output ports 12b.

For example, A phase modulation element such as LCOS (Liquid Crystal On Silicon) may be used as the light deflective element 30. Such a phase modulation element has a plurality of pixels which perform phase modulation and diffractively deflects the optical path of incident light by representing a diffraction-grating-like phase modulation pattern. Various elements such as MEMS (Micro Electro Mechanical Systems) element may also be used as the light deflective element 30.

When an LCOS is used as the light deflective element 30, it is preferred for the wavelength components L12, L22 to have optical axes orthogonal to the modulation plane of the phase modulation element within a plane including the predetermined axis C and x-axis (i.e., within the xz plane). This allows further fine deflection control. By appropriately setting the input/output angles θ1, −θ1 of the light input/output ports 11, 12, such that the optical axes of the wavelength components L12, L22 are set to be orthogonal to the modulation plane. In this case, it is preferable that the front optical system and condensing lens 43 have optical axes coinciding with each other in the x-axis direction. In this case, the optical axis of the input/output light L11, L12 of the light input/output port 11 and the optical axis of the input/output light L21, L22 of the light input/output port 12 can be made symmetrical to each other about the predetermined axis C. The predetermined axis C is orthogonal to the modulation plane of the phase modulation element.

The wavelength components L12, L22 deflected by the light deflective element 30 travel through the condensing lens 43, dispersive element 20, anamorphic optical system 42, and relay optical system 41, so as to reach the predetermined light output ports 11b, 12b, and then are outputted to the outside of the wavelength selective switch 1A.

Figure 6:
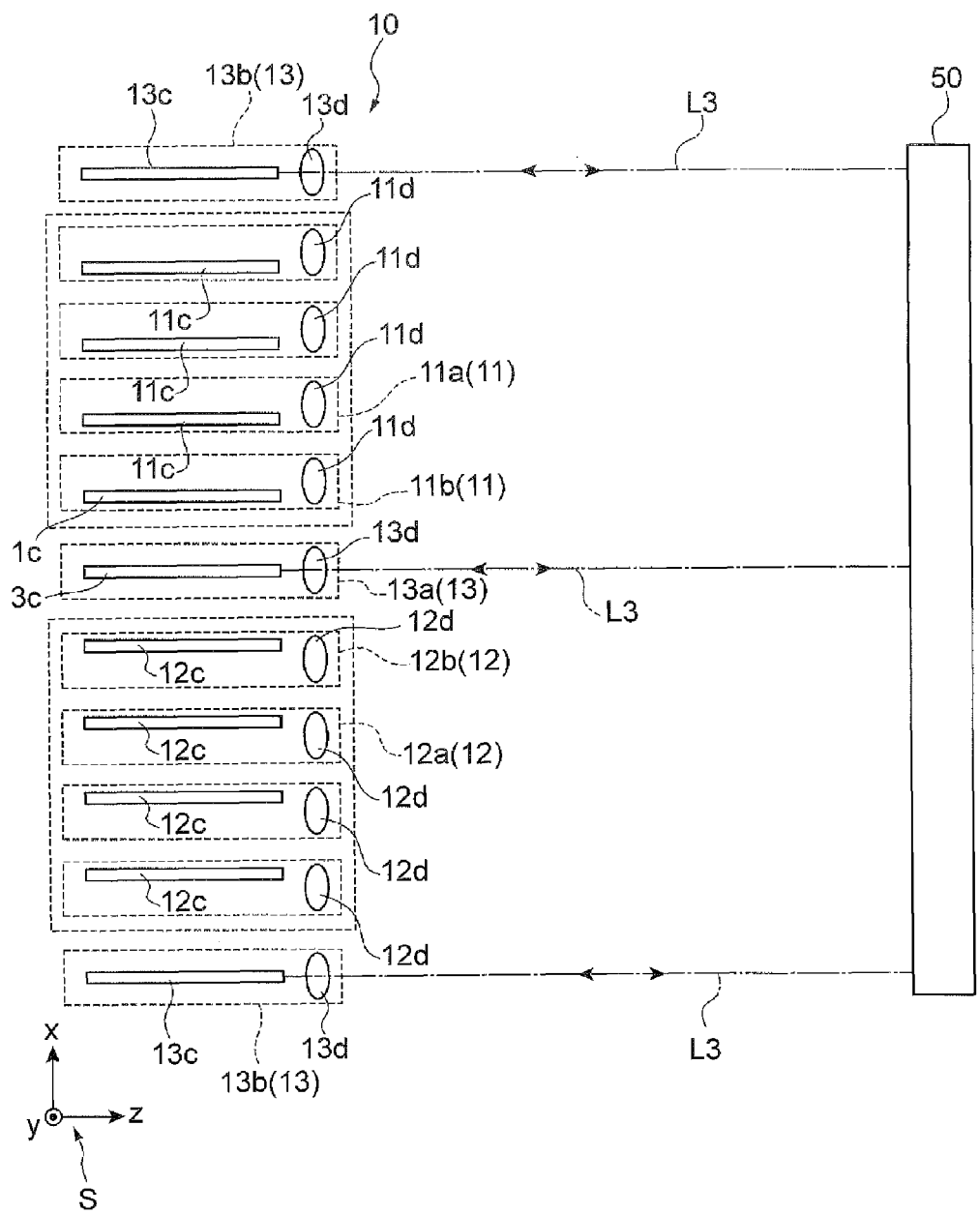
FIG. 6 is a diagram illustrating an alignment operation as seen from the y-axis direction.
Figure 10:
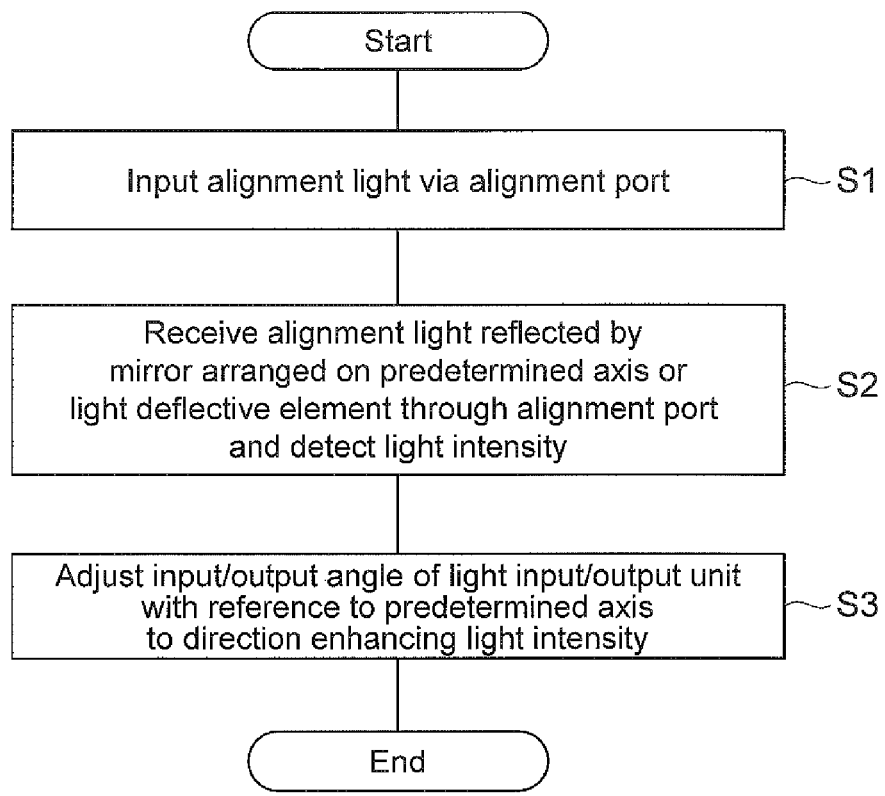
FIG. 10 is a flowchart illustrating an alignment process of the wavelength selective switch.

As a process in manufacturing the wavelength selective switch 1A constructed as in the foregoing, an alignment process will be explained. FIG. 6 is a diagram illustrating an alignment operation as seen from a direction of the y-axis of the orthogonal coordinate system S. FIG. 10 is a flowchart illustrating the alignment process of the wavelength selective switch 1A.

First, in the alignment process of this embodiment, a plane mirror 50 is arranged on the predetermined axis C in front of the light input/output unit 10 as illustrated in FIG. 6. The plane mirror 50 has a light reflective surface 50a perpendicular to the predetermined axis C. Subsequently, the alignment light L3 is inputted via three alignment ports 13 (first step S1). Since the input/output optical axes of the alignment ports 13 lie along the predetermined axis C as mentioned above, the alignment light propagates along (typically in parallel with) the predetermined axis C, so as to reach the light reflective surface 50a. The alignment light L3 is reflected by the light reflective surface 50a with its input angle and output angle both being 0°, so as to return to the alignment ports 13 through the original optical paths.

Figure 7:
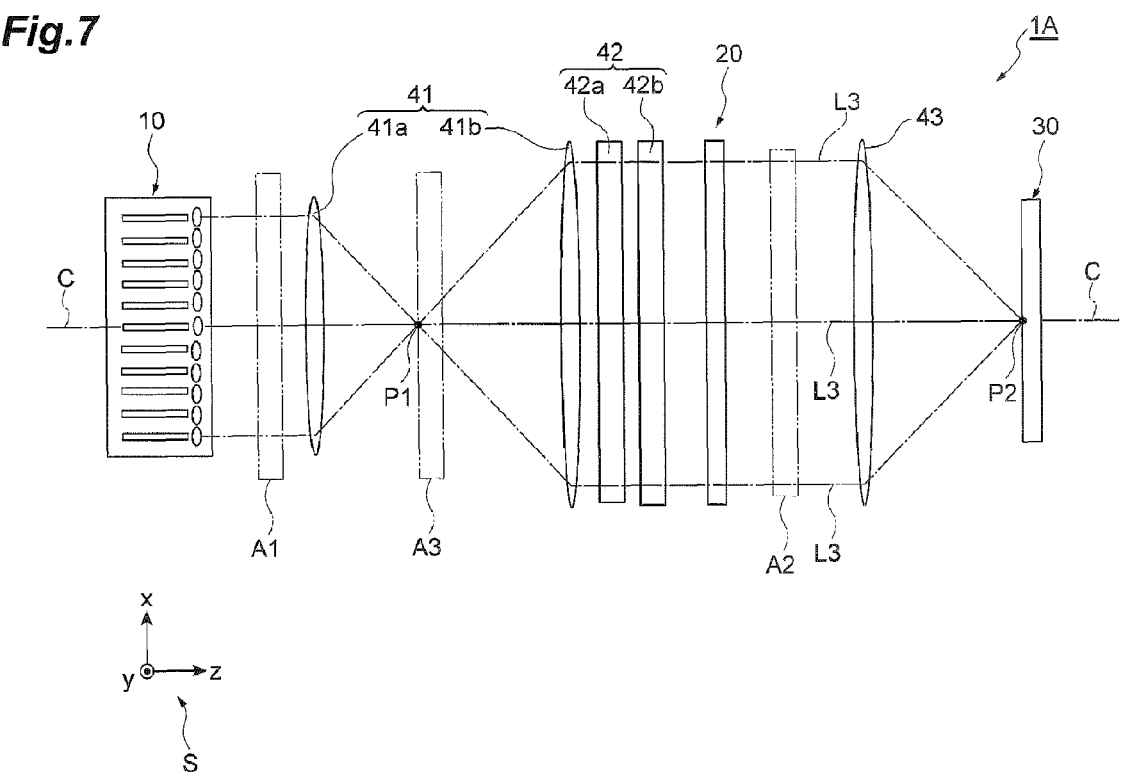
FIG. 7 is a diagram illustrating a typical example of optical paths of alignment light.

FIG. 7 is a diagram illustrating a typical example of optical paths of alignment light L3. As illustrated in FIG. 7, the optical paths of alignment light L3 in this embodiment extend along the predetermined axis C so as to be in parallel with each other between the light input/output unit 10 and the relay optical system 41 and between the relay optical system 41 and the condensing lens 43. Therefore, arranging the plane mirror 50 at a position between the relay optical system 41 and the light input/output unit 10 (at a depicted position A1) or at a position between the relay optical system 41 and the condensing lens 43 (at a depicted position A2) can return the alignment light L3 to the alignment ports 13. Alternatively, the plane mirror 50 may be arranged on an intersection P1 (at a depicted position A3) where a plurality of beams of light L3 respectively emitted from a plurality of alignment ports 13 intersect between the lens 41a and lens 41b of the relay optical system 41. In this case, the light L3 emitted from the alignment port 13 located at one end in the x-axis direction of the light input/output unit 10 returns to the alignment port 13 located at the other end in the x-axis direction of the light input/output unit 10.

The light deflective element 30 may be used in place of the plane mirror 50. That is, the light deflective element 30 may be provided with a light reflective part separately from the first deflective part 31 and the second light deflective part 32, so as to reflect the alignment light L3. In this case, unlike the light deflective parts 31, 32, the light reflective part reflects the light L3 with the input angle and output angle both being 0° without deflecting it. In this case, as illustrated in FIG. 7, a plurality of beams of light L3 respectively emitted from a plurality of alignment ports 13 reach one point P2 on the deflection plane of the light deflective element 30. Therefore, the light L3 emitted from the alignment port 13 located at one end of the light input/output unit 10 returns to the alignment port 13 located at the other end of the light input/output unit 10.

Figure 8:
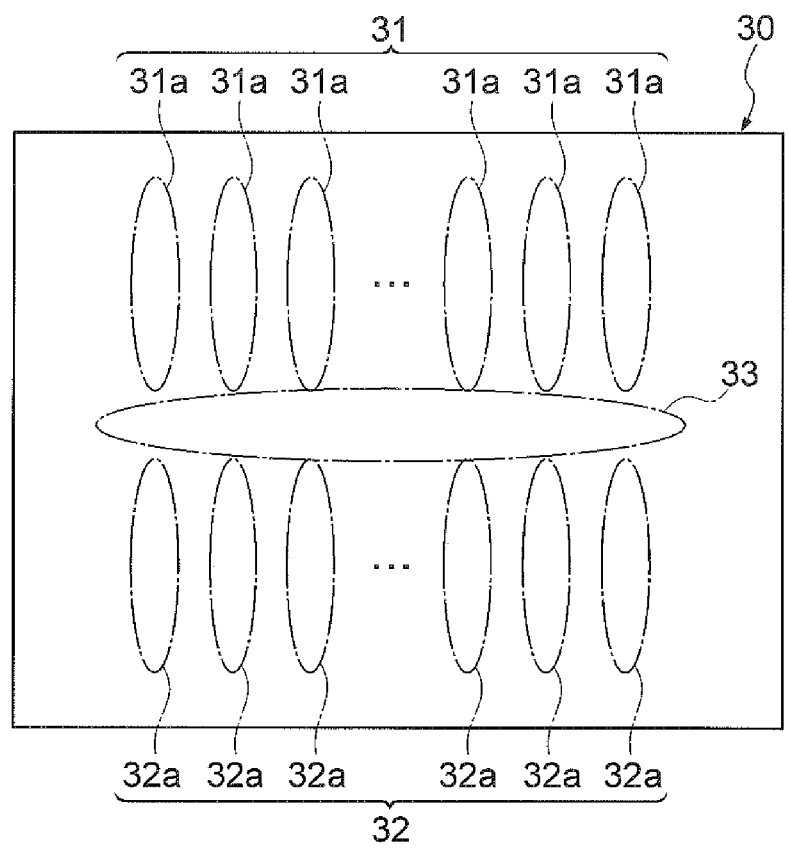
FIG. 8 is a front view of the light deflective element as seen from the z-axis direction illustrating a light reflective part for reflecting the alignment light in addition to first and second light deflective parts.
Figure 9:
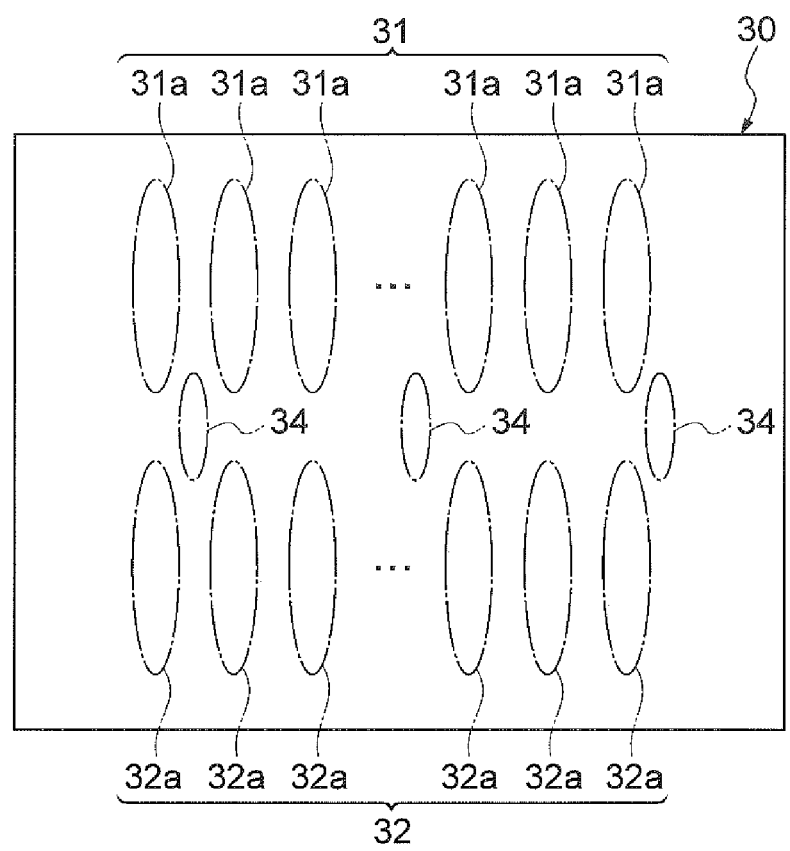
FIG. 9 is a front view of the light deflective element as seen from the z-axis direction illustrating the light reflective part for reflecting the alignment light in addition to the first and second light deflective parts.

FIGS. 8 and 9 are front views of the light deflective element 30 as seen from the z-axis direction. The first light deflective part 31 and the second light deflective part 32, and light reflective parts 33, 34 for reflecting the light L3 are illustrated. The light reflective part 33 illustrated in FIG. 8 is employed for receiving light L3 having a predetermined wavelength width (e.g., the bandwidth of wavelength-multiplexed light L11, L21) and is elongated in the dispersing direction (y-axis direction). A plurality of light reflective parts 34 illustrated in FIG. 9 are employed for receiving light L3 having a plurality of discrete wavelength components (e.g., wavelength components at both ends and the center of wavelength-multiplexed light L11, L21) and are juxtaposed in the dispersing direction (y-axis direction). As illustrated in FIGS. 8 and 9, the light reflective parts 33, 34 are arranged between the first light deflective part 31 and the second light deflective part 32 in the x-axis direction. Since the light L3 is incident on the diffraction grating 20 at an angle different from that of the light L11, L21, the positions of the light reflective parts 33, 34 slightly shift from the first and second light deflective parts 31, 32 in the y-axis direction. In other words, the positions of the first and second light deflective parts 31, 32 slightly shift from the light reflective parts 33, 34 in the y-axis direction.

Next, the alignment light L3 reflected by the plane mirror 50 or light deflective element 30 is received through the alignment port 13, so as to detect the intensity of the alignment light L3 (second step S2). Here, the detected intensity of the light L3 is lower as the optical axis of the light L3 is distanced farther from the alignment port 13. This means that the condensing elements 11d to 13d are shifted from a predetermined position with respect to the optical fibers 11c to 13c, for example.

In the subsequent third step S3, the input/output angle of the light input/output unit 10 is adjusted in such a direction that the intensity of the alignment light L3 obtained in the second step S2 increases, i.e., such a direction that the optical axis of the light L3 approaches the alignment port 13. First, in an example, relative positions of the condensing elements 11d to 13d and optical fibers 11c to 13c are adjusted such that the intensity of light L3 detected from the alignment port 13a arranged between the light input/output ports 11, 12 is maximized (i.e., optical loss is minimized). Subsequently, the relative positions of the condensing elements 11d to 13d and optical fibers 11c to 13c are adjusted such that the intensities of light L3 detected at two alignment ports 13b located at both ends of the row of the light input/output ports 11, 12 become more uniform. Ideally, the respective optical losses of light L3 detected at three alignment ports 13 can be minimized.

In thus constructed wavelength selective switch 1A of this embodiment, the light input/output unit 10 further has the alignment ports 13 for inputting and outputting the alignment light L3 along optical axes lying along the predetermined axis C, separately from the light input/output ports 11, 12. While the input/output lights of the input/output ports 11, 12 is tilted with respect to the predetermined axis C and thus is hard to be used for alignment, preparing such an alignment port 13 can easily perform the alignment operation.

As in this embodiment, the light input/output ports 11, 12 and alignment port 13 may include the optical fibers 11c to 13c, respectively. In this case, the optical axis directions of the optical fibers 11c, 12c and the optical axis of the input/output light (input/output directions) of the light input/output ports 11, 12 may differ from each other, while the optical axis directions of the optical fibers 13c and the optical axis of the input/output light (input/output directions) of the alignment ports 13 may coincide with each other. This can align the optical axis directions of the optical fibers 11c to 13c with the predetermined axis C, for example, thereby making it easier to manufacture the wavelength selective switch 1A.

When the optical axes of the optical fibers 11c to 13c lie along the predetermined axis C, the light input/output ports 11, 12 may include the condensing elements 11d, 12d optically coupled to the end faces of the optical fibers 11c, 12c, while the optical axes of the optical fibers 11c, 12c and those of the condensing elements 11d, 12d may shift from each other. The alignment ports 13 may include the condensing elements 13d optically coupled to the end faces of the optical fibers 13c, while the optical axes of the optical fibers 13c and those of the condensing elements 13d may coincide with each other. This can easily achieve the input/output angles of the light input/output ports 11, 12 tilted with respect to the predetermined axis C and the input/output angles of the alignment ports 13 lying along the predetermined axis C. Such a mode allows the light input/output ports 11, 12 to secure sufficient effective diameters. Therefore, even when the wavelength selective switch 1A is made smaller, the absolute value of input/output angles θ1, −θ1 can be made sufficiently large.

When the light input/output port 11 and the light input/output port 12 are juxtaposed in a certain direction as in this embodiment, the alignment ports 13 may be arranged at both ends in the row of the light input/output ports 11, 12 and between the light input/output port 11 and the light input/output port 12. This makes it possible to perform the alignment operation for the light input/output unit 10. Only the alignment port 13a or only two alignment ports 13b may be employed as the alignment ports 13.

In the wavelength selective switch 1A of this embodiment, the front optical systems (relay optical system 41 and anamorphic optical system 42) are arranged between the light input/output unit 10 and dispersive element 20 on the predetermined axis C. In this case, the plane mirror 50 may be arranged between the light input/output unit 10 and the front optical system. This makes it possible to align the condensing elements 11d to 13d with respect to the optical fibers 11c to 13c of the light input/output unit 10 accurately without being influenced by positional errors of other optical components. The plane mirror 50 may also be arranged between the relay optical system 41 and condensing lens 43 or at the intersection P1 where a plurality of beams of light L3 intersect between the lens 41a and lens 41b of the relay optical system 41. The light deflective element 30 may be used in place of the plane mirror 50. Any of them makes it possible to align the condensing elements 11d to 13d without being influenced by the positional errors of the optical components other than the condensing elements 11d to 13d.

First Modified Example

Figure 11:
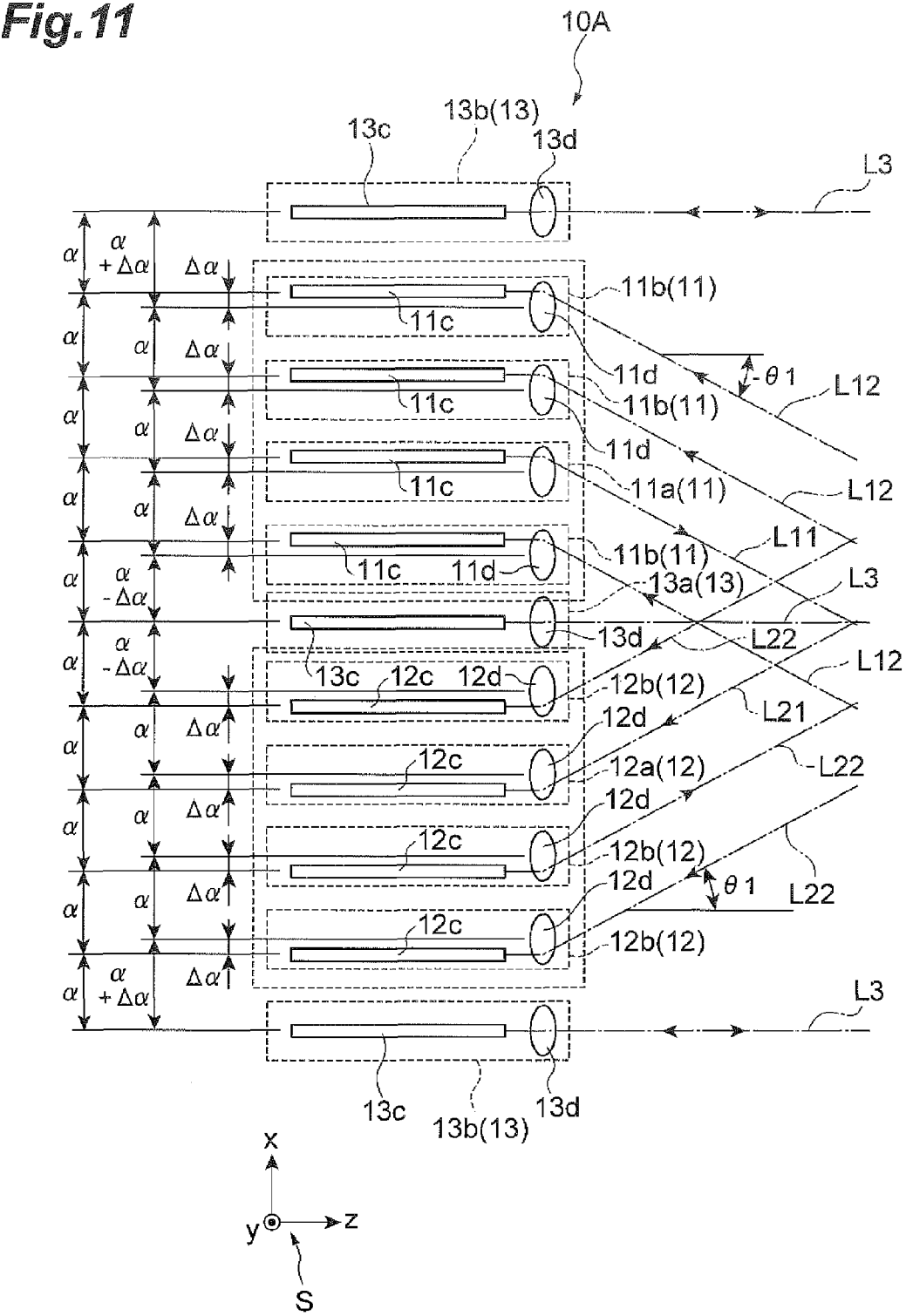
FIG. 11 is a side view schematically illustrating the structure of the light input/output unit in accordance with a first modified example.

FIG. 11 is a side view schematically illustrating a structure of an light input/output unit 10A in accordance with a modified example of the above-mentioned first embodiment. FIG. 11 illustrates the light input/output unit 10A seen form the y-axis. Unlike the above-mentioned embodiment (see FIG. 4), the optical axes of the condensing elements 11d are shifted from those of the optical fibers 11c by −Δα in the light input/output unit 10A in accordance with this modified example. At least three of the light input/output ports 11 have the same amount of shift −Δα. This provides at least three of the light input/output ports 11 with a uniform negative input/output angle −θ1.

The optical axes of the condensing elements 12d are shifted from those of their corresponding optical fibers 12c by Δα in the positive direction. At least three of the light input/output ports 12 have the same amount of shift Δα. This provides at least three of the light input/output ports 12 with a uniform positive input/output angle θ1.

Thus, the optical fibers 11c, 12c, 13c are arranged at equal pitches in this modified example. On the other hand, the condensing elements 11d, 12d, 13d are arranged at unequal pitches. The positions of the condensing elements 11d are shifted from their corresponding optical fibers 11c to one side of the arrangement direction (negative side of the x-axis). The positions of the condensing elements 12d are shifted from their corresponding optical fibers 12c to the other side of the arrangement direction (positive side of the x-axis). Therefore, the input/output angles become negative (−θ1) in the light input/output ports 11. On the other hand, the input/output angles become positive (θ1) in the light input/output ports 12 located on the negative side of the x-axis with respect to the light input/output ports 11. Therefore, the input/output light of light input ports 11 and the input/output light of the light input ports 12 intersect. Such a mode also makes it easy to perform the alignment operation by using the alignment ports 13 as with the above-mentioned first embodiment.

Second Modified Example

Figure 12:
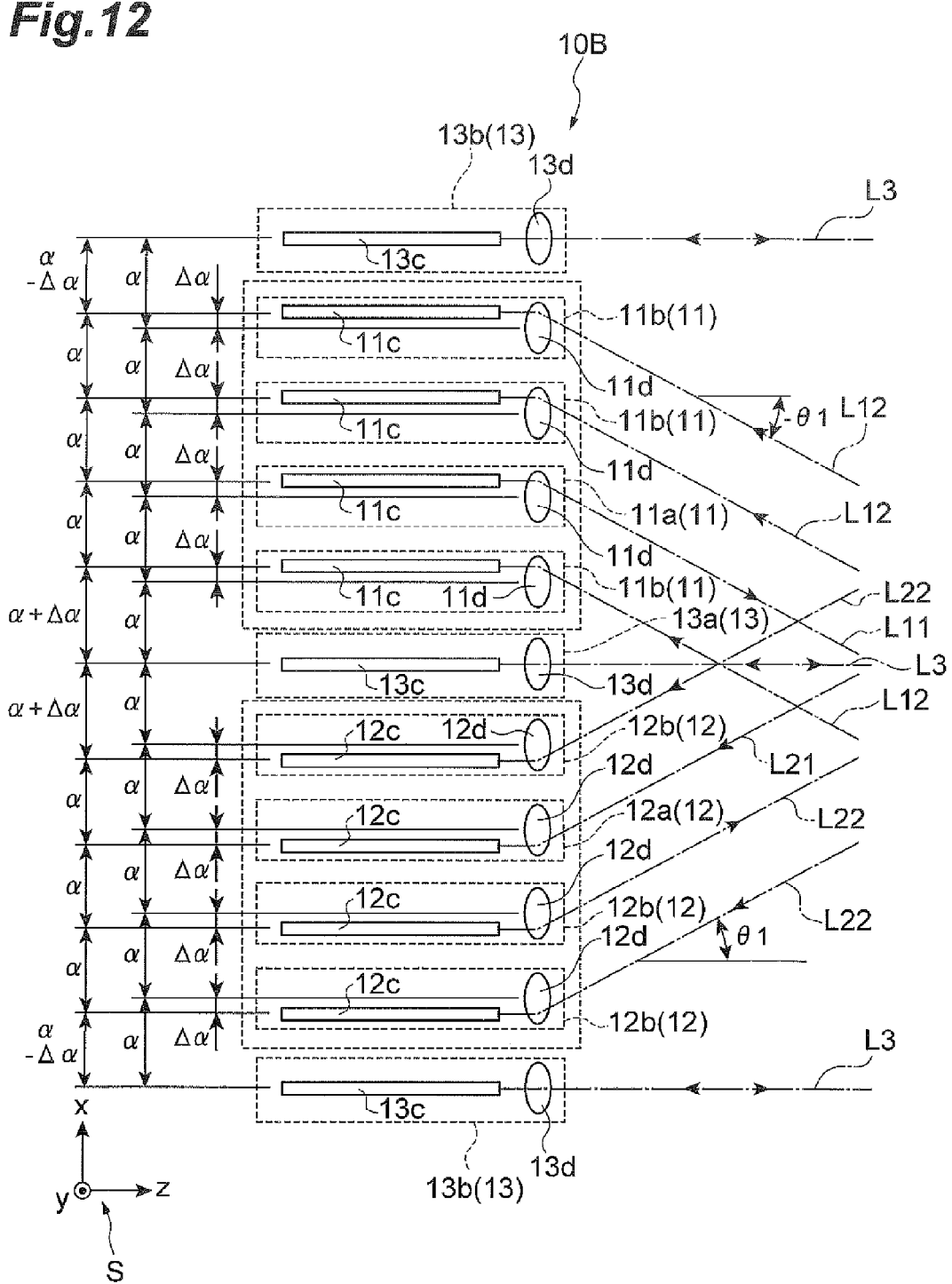
FIG. 12 is a side view schematically illustrating the structure of the light input/output unit in accordance with a second modified example.

FIG. 12 is a side view schematically illustrating a structure of an light input/output unit 10B in accordance with another modified example of the above-mentioned first embodiment. FIG. 12 illustrates the light input/output unit 10B seen from the y-axis direction. Unlike the above-mentioned first modified example (see FIG. 11), the optical axes of the optical fibers 11c are shifted from those of the condensing elements 11d by Δα in the positive direction in the light input/output unit 10B in accordance with this modified example. At least three of the light input/output ports 11 have the same amount of shift Δα. This provides at least three of the light input/output ports 11 with a uniform negative input/output angle −θ1.

The optical axes of the optical fibers 12c are shifted from those of their corresponding condensing elements 12d by −Δα. At least three of the light input/output ports 12 have the same amount of shift −Δα. This provides at least three light input/output ports 12 with a uniform positive input/output angle θ1.

Thus, the condensing elements 11d, 12d, 13 d are arranged at equal pitches in this modified example. On the other hand, the optical fibers 11c, 12c, 13c are arranged at unequal pitches. The positions of the optical fibers 11c are shifted from their corresponding condensing elements 11d to one side of the arrangement direction (positive side of the x-axis). The positions of the optical fibers 12c are shifted from their corresponding condensing elements 12d to the other side of the arrangement direction (negative side of the x-axis). Therefore, the input/output angles become negative (−θ1) in the light input/output ports 11. On the other hand, the input/output angles become positive (θ1) in the light input/output ports 12 located on the negative side of the x axis with respect to the light input/output ports 11. Therefore, the input/output light of the light input ports 11 and the input/output light of the light input ports 12 intersect. Such a mode also makes it easy to perform the alignment operation by using the alignment ports 13 as with the above-mentioned first modified example.

The condensing elements 11d, 12d, 13d may also be arranged at equal pitches in the above-mentioned first embodiment. The optical fibers 11c, 12c, 13c may also be arranged at unequal pitches. In this case, the positions of the optical fibers 11c may be shifted to the negative side of the x-axis with respect to the condensing elements 11d. The positions of the optical fibers 12c may be shifted to the positive side of the x-axis with respect to the condensing elements 12d. This makes the input/output angles become positive (θ1) in the light input/output ports 11. On the other hand, the input/output angles become negative (−θ1) in the light input/output ports 12 located on the negative side of the x-axis with respect to the light input/output ports 11.

Third Modified Example

Figure 13:
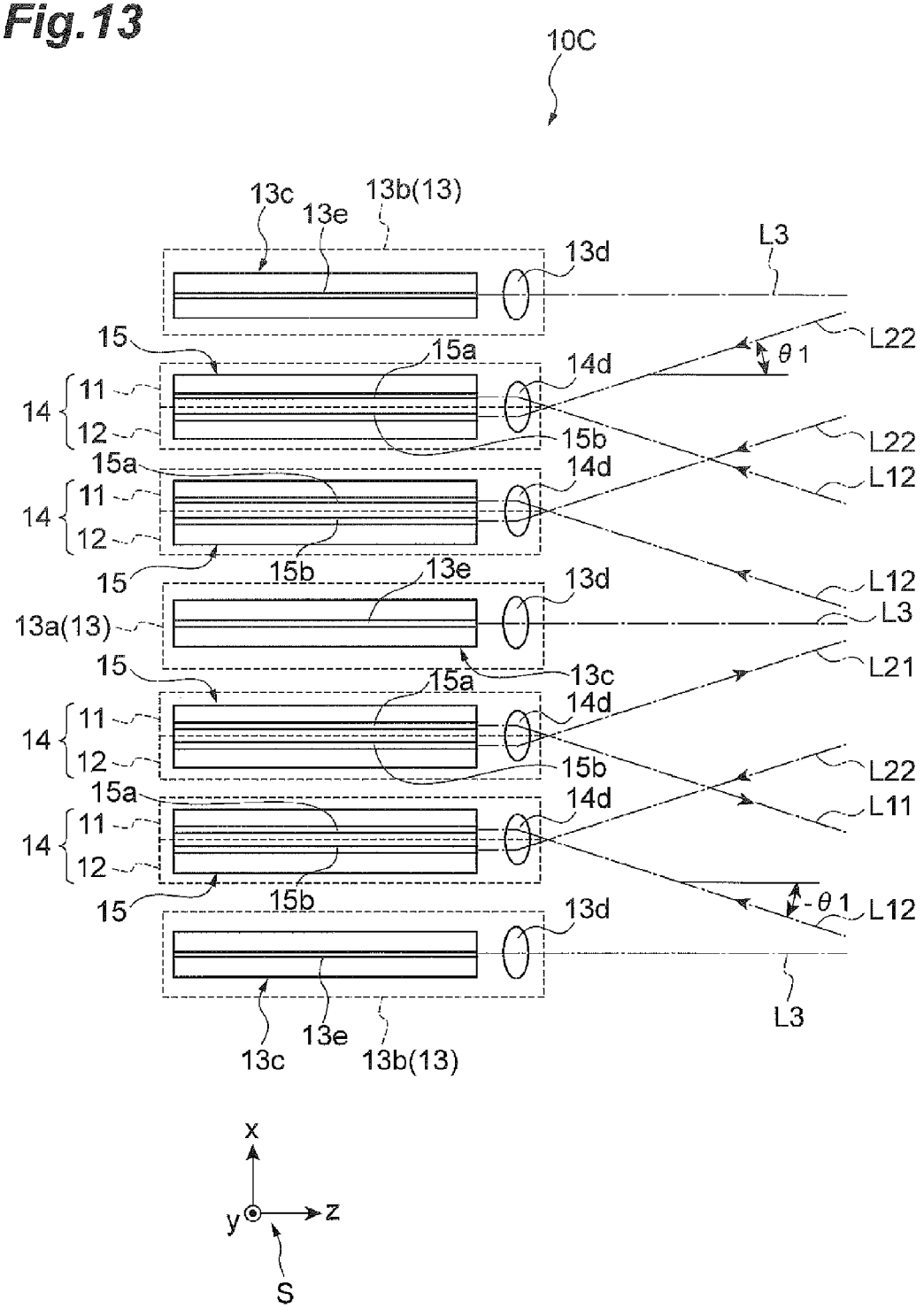
FIG. 13 is a side view schematically illustrating the structure of the light input/output unit in accordance with a third modified example.

FIG. 13 is a side view schematically illustrating a structure of an light input/output unit 10C in accordance with still another modified example of the above-mentioned first embodiment. FIG. 13 illustrates the light input/output unit 10C seen from the y-axis direction. Unlike the above-mentioned embodiment (see FIG. 4), a plurality of port groups 14 including the light input/output port 11 and the light input/output port 12 are juxtaposed along the x-axis direction in the light input/output unit 10C in accordance with this modified example. The light input/output ports 11, 12 are alternately juxtaposed along the x-axis direction.

Specifically, each port group 14 has a multicore optical fiber 15. The multicore optical fiber 15 includes at least two cores (optical waveguides) 15a, 15b juxtaposed along the x-axis direction. One core 15a constitutes the light input/output port 11, while the other core 15b constitutes the light input/output port 12. Each port group 14 has one condensing element 14d. The condensing element 14d is optically coupled to end faces of the two cores 15a, 15b. The optical axis of the core 15a is shifted in the positive direction of the x-axis with respect to the optical axis of its corresponding condensing element 14d. This provides the light input/output ports 11 with a negative input/output angle −θ1. The optical axis of the core 15b is shifted in the negative direction of the x-axis with respect to the optical axis of its corresponding condensing element 14d. This provides the light input/output ports 12 with a positive input/output angle θ1.

Thus, the positions of the condensing elements 14d are shifted to one side of the arrangement direction (positive side of the x-axis) with respect to the cores 15a. The positions of the condensing elements 14d are also shifted to the other side of the arrangement direction (negative side of the x-axis) with respect to the cores 15b. Therefore, the input/output angles become negative (−θ1) in the light input/output ports 11. On the other hand, the input/output angles become positive (θ1) in the light input/output ports 12. Since the light input/output ports 11, 12 are alternately juxtaposed in this modified example, the input/output light of the light input/output ports 11 and the input/output light of the light input/output ports 12 intersect.

The alignment port 13a is placed between a plurality of port groups 14 arranged in a row (e.g., near the center of the row of the plurality of port groups 14). The alignment ports 13b are arranged at both ends of the row of the plurality of port groups 14, respectively. Each of the optical fibers 13c constituting the alignment ports 13 is a single-core optical fiber having a single core 13e. The optical axis of the core 13e coincides with the optical axis of its corresponding condensing element 13d. This allows the alignment ports 13 to receive and emit the light L3 with optical axes lying along the predetermined axis C.

Such a mode also makes it easy to perform the alignment operation by using the alignment ports 13 as with the above-mentioned first embodiment.

Fourth Modified Example

Figure 14:
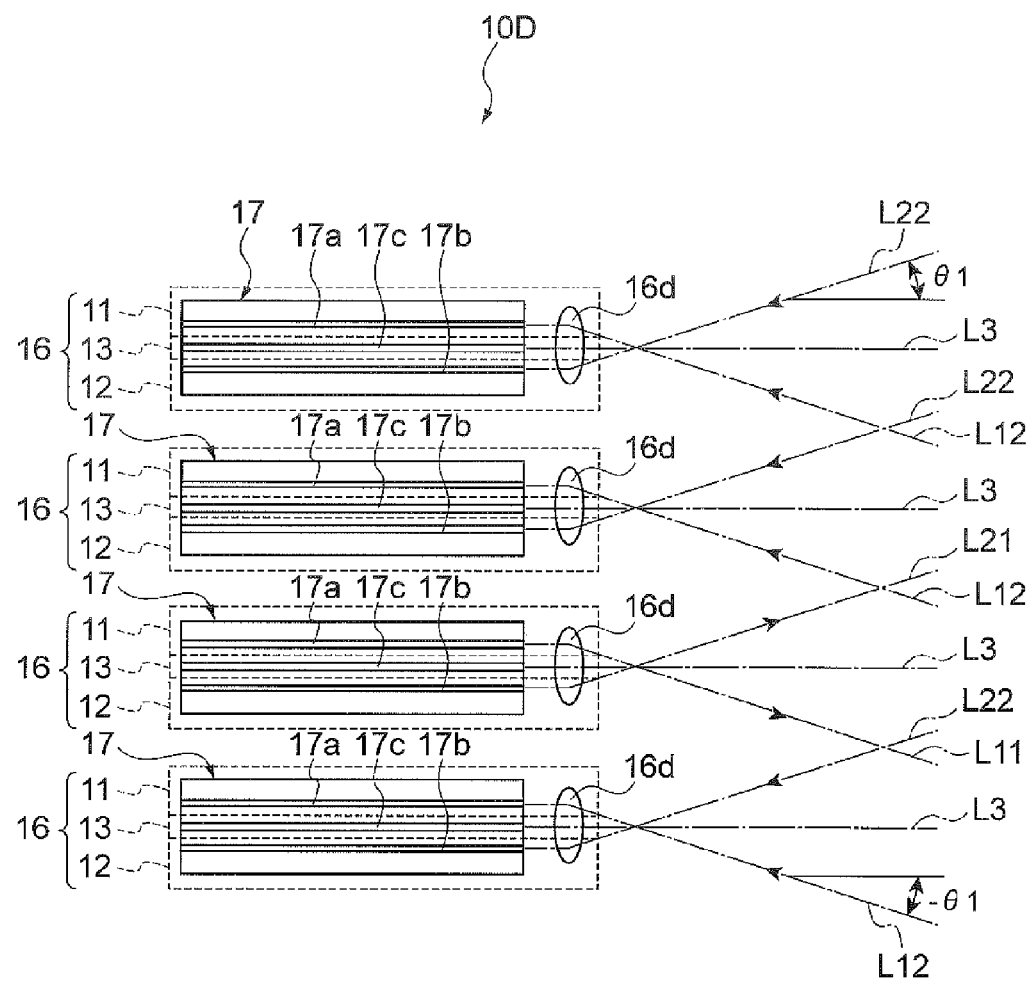
FIG. 14 is a side view schematically illustrating the structure of the light input/output unit in accordance with a fourth modified example.

FIG. 14 is a side view schematically illustrating a structure of an light input/output unit 10D in accordance with yet another modified example of the above-mentioned first embodiment. FIG. 14 illustrates a mode in which the light input/output unit 10D is seen from the y-axis direction. A plurality of port groups 16 including light input/output ports 11, 12 and alignment ports 13 are juxtaposed along the x-axis direction in the light input/output unit 10D in accordance with this modified example. The light input/output ports 11, 12 are alternately juxtaposed along the x axis. The alignment port 13 is arranged between the light input/output port 11 and the light input/output port 12.

Specifically, each port group 16 has a multicore optical fiber 17. The multicore optical fiber 17 includes at least three cores (optical waveguides) 17a to 17c juxtaposed along the x-axis direction. The cores 17a, 17b, 17c constitute the light input/output port 11, the light input/output port 12, and alignment port 13, respectively. Each port group 16 has one condensing element 16d. The condensing element 16d is optically coupled to end faces of the three cores 17a to 17c. The optical axis of the core 17a is shifted in the positive direction of the x-axis with respect to the optical axis of the condensing element 16d. This provides the light input/output port 11 with a negative input/output angle (−θ1). The optical axis of the core 17b is shifted in the negative direction of the x-axis with respect to the optical axis of the condensing element 16d. This provides the light input/output port 12 with a positive input/output angle (θ1). The optical axis of the core 17 coincides with that of the condensing element 16d. This allows the alignment port 13 to input and output the light L3 with its optical axis lying along the predetermined axis C.

Such a mode also makes it easy to perform the alignment operation by using the alignment ports 13 as with the above-mentioned first embodiment.

Fifth Modified Example

Figure 15:
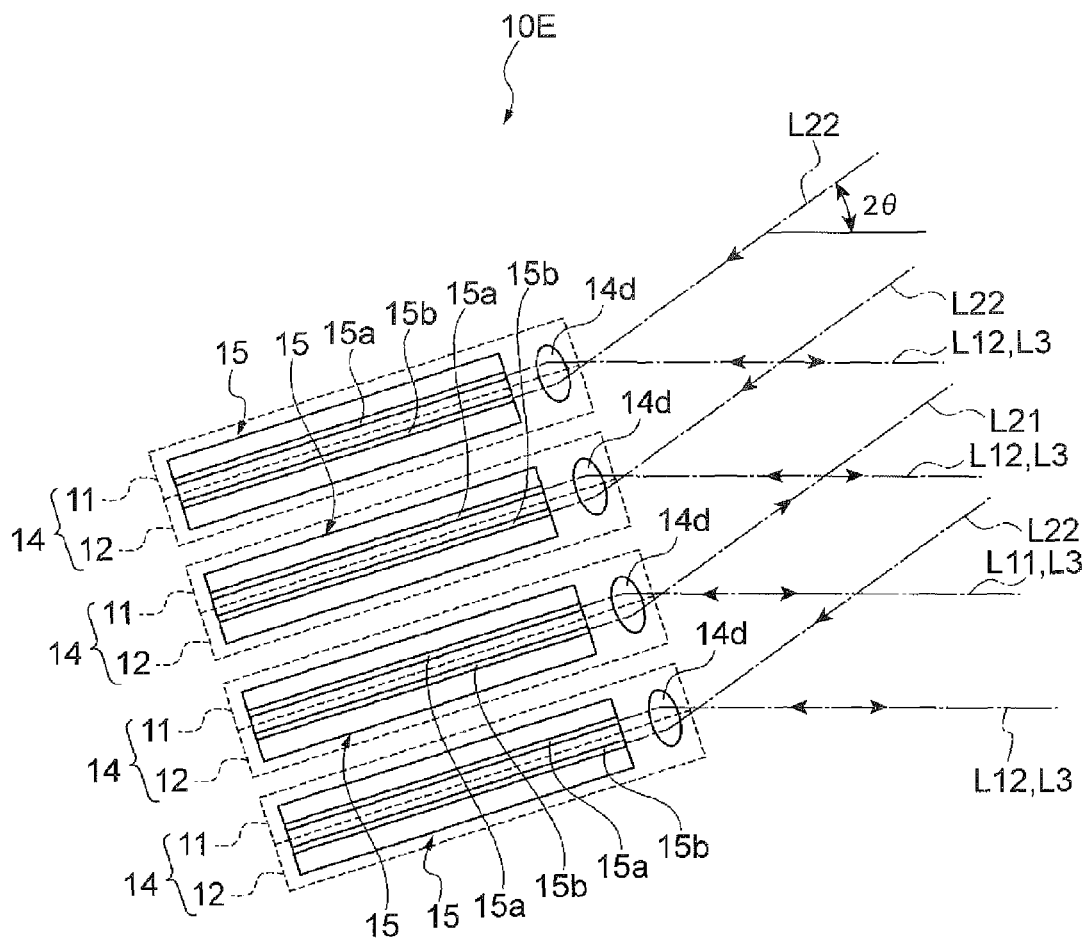
FIG. 15 is a side view schematically illustrating the structure of the light input/output unit in accordance with a fifth modified example.

FIG. 15 is a side view schematically illustrating a structure of an light input/output unit 10E in accordance with a further modified example of the above-mentioned first embodiment. FIG. 15 illustrates a mode in which the light input/output unit 10E is seen from the y-axis direction. A plurality of port groups 14 in accordance with the third modified example are juxtaposed along the x-axis direction in the light input/output unit 10E in accordance with this modified example. The light input/output ports 11, 12 are alternately juxtaposed along the x-axis direction.

However, unlike the third modified example, no alignment ports are arranged independently from the plurality of port groups 14 in this modified example. That is, the light input/output port 11 also serves as an alignment port in each port group 14 in this modified example. The light input/output port 11 inputs and outputs light L11, L12 and alignment light L3 with the optical axis lying along the predetermined axis C. Such a mode is achieved by tilting the optical axis of the multicore optical fiber 15 constituting each port group 14 by an angle θ1 with respect to the predetermined axis C, for example. In this case, the input/output light L21, L22 of the light input/output ports 12 forms an angle 2θ with the predetermined axis C.

Such a mode also makes it easy to perform the alignment operation by using the light input/output ports 11 (alignment ports).

The wavelength selective switch and method of manufacturing the same in accordance with each of the above-mentioned embodiment and modified examples can be modified in various ways. For example, the light input/output ports and alignment ports are explained as those including optical fibers and condensing lenses in each of the above-mentioned embodiment and modified examples but are not limited to such modes.

While the above-mentioned embodiment and first to third modified examples illustrate a case where the light input/output unit has three alignment ports, it is sufficient for the light input/output unit to have at least one alignment port. The alignment ports may be arranged in various ways without being restricted to the above-mentioned embodiment and first to third modified examples.

While the above-mentioned third to fifth modified examples use multicore optical fibers, parts corresponding to a plurality of cores of a multicore optical fiber may be constituted by a plurality of single-core optical fibers. Such a mode can also yield operations and effects similar to those of the third to fifth modified examples.

What is claimed is:

1. A wavelength selective switch comprising an light input/output unit, a dispersive element, and a light deflective element which are optically coupled along a predetermined axis;
   wherein the light input/output unit has:
   at least three first light input/output ports, including a first light input port for inputting light and a first light output port for outputting light, an optical axis of input/output light being tilted to a first direction with respect to the predetermined axis, the first direction intersecting the predetermined axis;
   at least three second light input/output ports, including a second light input port for inputting light and a second output port for outputting light, an optical axis of input/output light being tilted to the first direction with respect to the predetermined axis; and
   an alignment port for inputting and outputting alignment light with an optical axis along the predetermined axis;
   wherein the optical axis of the input/output light of the first light input/output port and the optical axis of the input/output light of the second light input/output port are different from each other;
   wherein the dispersive element changes the optical axis of the input/output light of the first light input/output port and the optical axis of the input/output light of the second light input/output port to a direction intersecting the predetermined axis and first direction by an angle corresponding to a wavelength;
   wherein the light deflective element has:
   a first light deflective part for directing the light input from the first light input port via the dispersive element to the first light output port; and
   a second light deflective part for directing the light input from the second light input port via the dispersive element to the second light output port.

2. The wavelength selective switch according to claim 1, wherein each of the first light input/output port, the second light input/output port, and the alignment port includes an optical fiber;
   wherein an optical axis direction of the optical fiber of the first light input/output port is different from the optical axis of the input/output light of the first light input/output port, and an optical axis direction of the optical fiber of the second light input/output port is different from the optical axis of the input/output light of the second light input/output port; and
   wherein an optical axis direction of the optical fiber of the alignment port coincides with the optical axis of the alignment light.

3. The wavelength selective switch according to claim 2, wherein the optical fiber of the first light input/output port, the optical fiber of the second light input/output port, and the optical fiber of the alignment port have optical axis along the predetermined axis;
   wherein each of the first input/output port, the second light input/output port, and the alignment port further includes a condensing element optically coupled to an end face of the optical fiber;
   wherein an optical axis of the optical fiber of the first light input/output port and an optical axis of the optical fiber of the second light input/output port, and an optical axis of the condensing element are shifted from each other; and
   wherein an optical axis of the optical fiber of the alignment port coincides with the optical axis of the condensing element.

4. The wavelength selective switch according to claim 3, wherein an amount of shift between the optical axis of the optical fiber of the first light input/output port and the optical axis of the condensing element is identical;
   wherein an amount of shift between the optical axis of the optical fiber of the second light input/output port and the optical axis of the condensing element is identical; and
   wherein the amount of shift in the first light input/output port and the amount of shift in the second light input/output port are different from each other.

5. The wavelength selective switch according to claim 1, wherein the first light input/output port and the second light input/output port are juxtaposed in the first direction; and
   wherein the alignment port is disposed at either both ends of the row of the first input/output port and the second light input/output port or a location between the first light input/output port and second light input/output port, or both.

6. The wavelength selective switch according to claim 1, wherein the first light input/output port, the second light input/output port, and the alignment port include an optical waveguide and a condensing element optically coupled to an end face of the optical waveguide;
   wherein an optical axis of the optical waveguide constituting the first light input/output port and the second light input/output port shifts from an optical axis of the condensing element; and
   wherein an optical axis of the optical waveguide constituting the alignment port coincides with an optical axis of the condensing element.

7. A method of manufacturing the wavelength selective switch according to claim 1, the method comprising:
   a first step of inputting alignment light via the alignment port;
   a second step of receiving the alignment light reflected by a mirror arranged on the predetermined axis or the light deflective element through the alignment port so as to detect an intensity of the alignment light; and
   a third step of adjusting an angle of the optical axis of the light input/output unit with reference to the predetermined axis in such a direction that the intensity of the alignment light obtained in the second step increases.

8. The method of manufacturing the wavelength selective switch according to claim 7, wherein the wavelength selective switch further comprises a front optical system arranged between the light input/output unit and dispersive element on the predetermined axis; and
   wherein the mirror is arranged between the light input/output unit and the front optical system, so as to receive the alignment light reflected by the mirror through the alignment port.

9. The method of manufacturing the wavelength selective switch according to claim 7, wherein the light input/output unit has a plurality of alignment ports; and
   wherein the angle is adjusted in such direction that equalize intensities of the alignment lights received through the plurality of alignment ports in the third step.

* * * * *